(12) United States Patent
Byun et al.

(10) Patent No.: US 7,216,584 B2
(45) Date of Patent: May 15, 2007

(54) METHOD OF FORMING ALIGNMENT LAYER FOR LIQUID CRYSTAL DISPLAY DEVICE

(75) Inventors: Young-Sang Byun, Gyeongsangbuk-do (KR); Kyung-Su Chae, Daegu (KR); Heon-do Yun, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 109 days.

(21) Appl. No.: 10/732,270

(22) Filed: Dec. 11, 2003

(65) Prior Publication Data
US 2004/0126540 A1    Jul. 1, 2004

(30) Foreign Application Priority Data
Dec. 31, 2002    (KR)    ............... 10-2002-0088327

(51) Int. Cl.
*B41M 1/10*    (2006.01)
(52) U.S. Cl. ....................... 101/170; 101/483
(58) Field of Classification Search ........... 101/169, 101/170, 212, 483, 485
See application file for complete search history.

(56) References Cited

FOREIGN PATENT DOCUMENTS

| EP | 0147199 A2 * | 7/1985 |
|---|---|---|
| JP | 07-020472 | 1/1995 |
| JP | 07-270795 | 10/1995 |
| JP | 08-295006 | 11/1996 |
| JP | 2002293049 A * | 10/2002 |
| KR | 1020020077034 A | 10/2002 |

* cited by examiner

*Primary Examiner*—Ren Yan
(74) *Attorney, Agent, or Firm*—McKenna Long & Aldridge LLP

(57) ABSTRACT

A method of forming an alignment layer for a liquid crystal display device including: attaching a transfer film on a printing roll, the transfer film including a convex portion having first-sized halftone dots and second-sized halftone dots; positioning a substrate on a printing table; providing aligning solution on an anilox roll using a doctor roll; and transferring the aligning solution on the anilox roll to the transfer film while moving the printing table and rotating the printing roll, and then coating the aligning solution on the substrate to thereby form an alignment layer on the substrate.

8 Claims, 6 Drawing Sheets

METHOD OF FORMING ALIGNMENT LAYER FOR LIQUID CRYSTAL DISPLAY DEVICE

The present invention claims the benefit of Korean Patent Application No. 2002-88327 filed in Korea on Dec. 31, 2002, which is hereby incorporated by reference.

BACKGROUND OF THE INVENTION

1. Field of the Invention

The present invention relates to a liquid crystal display (LCD) device and more particularly, to a method of forming an alignment layer for the liquid crystal display device.

2. Discussion of the Related Art

In general, a liquid crystal display (LCD) device includes two substrates that are spaced apart and face each other with a liquid crystal material layer interposed between the two substrates. Each of the substrates includes electrodes that face each other. Voltages applied to each of theses electrode induces an electric field between the electrodes and within the liquid crystal material layer.

The liquid crystal material layer includes a dielectric anisotropic material having spontaneous polarization properties. Accordingly, when an electric field is induced in the liquid crystal material layer, the liquid crystal molecules form a dipole due to the spontaneous polarization characteristic of the liquid crystal material. Thus, the liquid crystal molecules of the liquid crystal material layer are arranged to correspond with the direction of the applied electric field. Optical modulation of the liquid crystal material layer occurs in accordance with to the arrangement of the liquid crystal molecules. Therefore, images are produced on the LCD device by controlling light transmittance of the liquid crystal material layer using optical modulation.

FIG. 1 is an exploded perspective view of a liquid crystal display (LCD) device according to the related art. In FIG. 1, an LCD device 11 has upper and lower substrates 5 and 10, which are spaced apart from and facing each other. A liquid crystal material layer 9 is interposed between the upper and lower substrates 5 and 10.

The upper substrate 5 includes a black matrix 6, a color filter layer 7, and a transparent common electrode 18 disposed on a surface of the upper substrate 5 that faces the lower substrate 10. The black matrix 6 has openings such that the color filter layer 7 is in each of the openings of the black matrix 6. Each opening of the black matrix 6 has a color filter layer 7 including one of the three sub-color filters of red (R), green (G), and blue (B). Accordingly, the upper substrate 5 can be referred to as the color filter substrate.

A gate line 14 and a data line 22 are formed on a surface of the lower substrate 10 facing the upper substrate 5. The gate line 14 and the date line 22 cross each other to define a pixel area P. A thin film transistor T is formed adjacent to the crossing of the gate line 14 and the data line 22. The thin film transistor T has a gate electrode, a source electrode, and a drain electrode. A pixel electrode 36, which is connected to the thin film transistor T, is formed within the pixel area P and corresponds to one of the sub-color filters. The pixel electrode 36 is made of a transparent conductive material, such as indium-tin-oxide (ITO). The lower substrate 22 can be referred to as an array substrate.

In the LCD device of the related art, the array substrate is fabricated by forming a plurality of switching elements, such as thin film transistors, a plurality of pixel electrodes corresponding to the plurality of switching elements, the gate and data lines crossing each other and connected to the switching elements, and pads disposed at ends of the gate and data lines through deposition, photolithography, and etching processes. The color filter substrate is manufactured by sequentially forming the black matrix, the color filter layer and the common electrode on a surface facing the array substrate. The array substrate and the color filter substrate are then attached to each other. The LCD device is completed by injecting liquid crystal material into a space between the array substrate and the color filter substrate.

The LCD device utilizes electro-optical effect of the liquid crystal material, which are determined by anisotropies of the liquid crystal material and the arrangement of liquid crystal molecules in the liquid crystal material. Therefore, controlling the arrangement of the liquid crystal molecules has a large effect on imaging properties of an LCD device. To make an initial arrangement of the liquid crystal molecules uniform, an aligning process is performed. The aligning process may be accomplished by a rubbing method, for example. An alignment layer of a predetermined thickness may be formed on the array substrate and then hardened. In addition or in the alternative, the alignment layer can be formed on the color substrate. To arrange the surface of the alignment layer in a specified direction, the hardened alignment layer is rubbed with a particular cloth, which is referred to as a rubbing fabric. Thus, polymer chains in the alignment layer are arranged in the specified direction, so that the initial arrangement of the liquid crystal molecules may be made uniform.

The alignment layer makes the liquid crystal molecules possess the order and uniformity of single crystal. An alignment layer can be categorized as an inorganic alignment layer and an organic alignment layer. Polyimide (PI) is an organic alignment layer that is widely used.

The alignment layer may be generally formed by a roll coating method, which uses a printing apparatus including a plurality of rolls and a printing table and a transfer film attached to the printing apparatus. Formation of the alignment layer will be explained in detail with reference to FIG. 2. FIG. 2 shows a process of printing an alignment layer using a roll coating method according to the related art.

In FIG. 2, a printing apparatus 1 includes a printing table 2 that reciprocates in a plane, a printing roll 5 that rotates in correspondence with a reciprocation of the printing table 2, a transfer film 15 attached on the printing roll 5, an anilox roll 8 that transfers aligning solution to the transfer film 15, and a doctor roll 10 for uniformly coating the anilox roll 8 with the aligning solution. A substrate 13 is positioned on the printing table 2, and then the printing table 2 is moved toward the printing roll at a constant speed. When the printing roll 5 engages with the substrate 13, the printing roll rotates and the transfer film 15 attached on the printing roll 5 contacts the substrate 13 on the printing table 2 so that the aligning solution on the transfer film 15 is transferred to the substrate 13. Thus, an alignment layer (not shown) is formed on the substrate 13. The alignment layer is dried to remove moisture therein and then cured to be hardened. Next, the hardened alignment layer is rubbed by a rubbing fabric under constant pressure so that polymer chains in the alignment layer are arranged in a specified direction.

FIG. 3A is a plan view of a related art transfer film and FIG. 3B is an enlarged view of the region M of FIG. 3A. FIG. 4A is a cross-sectional view of the related art transfer film and FIG. 4B is an enlarged view of the region N of FIG. 4A. As shown in FIGS. 3A, 3B, 4A and 4B, the transfer film 15 includes convex portions 17 and a ground portion 19. Each convex portion 17 possesses the aligning solution and transfers the aligning solution to the substrate 13 of FIG. 2.

The ground portion 19 surrounding the convex portions 17 does not contact the substrate 13 of FIG. 2. In general, the convex portion 17 has an average thickness T1 within a range of about 2.24 mm to about 2.84 mm, and the ground portion 19 has an average thickness T2 within a range of about 1.4 mm to about 2.0 mm.

The convex portion 17 includes a plurality of halftone dots 21, each of which has a shape of a truncated cone for containing the aligning solution of uniform quantity, and grooves 23, in which the aligning solution resides therein, are formed between the halftone dots 21. The plurality of halftone dots 21 has substantially the same height and the same size and spaces between the halftone dots 21 are also equal. That is, the grooves 23 have substantially the same depth and the same width. In addition, the halftone dots 21 of the convex portion 17 have sides inclined with respect to the lower surface of the transfer film 15. The convex portion 17 may includes the halftone dots of about 400 meshes.

FIG. 5A is a cross-sectional view of showing an alignment layer formed on a substrate according to the related art, and FIG. 5B is an enlarged view of the region E1 FIG. 5A. As shown in FIGS. 5A and 5B, an alignment layer 32 is coated on a substrate 30, which may be either an upper substrate or a lower substrate of a liquid crystal display device, and is then cured. The alignment layer 32 has a thickness within a range of about 700 Å to about 1,100 Å. However, the alignment layer 32, which is formed by the transfer film 15 illustrated in FIGS. 3A to 4B, may have a non-uniform thickness. That is, although the alignment layer 32 should have the thickness within a range of about 700 Å to about 1,100 Å, the alignment layer 32 may have a thickness within a range of about 1,400 Å to about 3,300 Å at edges thereof. Therefore, the alignment layer 32 at the edges has a thickness that is about two to about three times greater as compared with the central portion thereof. This problem causes a non-uniform gap between the color substrate and the array substrate in the liquid crystal display device. Thus, spots having different degrees of brightness occur in the displayed images when signal voltages are applied.

This problem of the alignment layer having a thicker thickness at the edges than at the central portion may be caused by a marginal phenomenon. The marginal phenomenon is as follows. In the printing apparatus of the alignment layer, the transfer film having halftone dots of the same size is attached on the printing roll, and the printing roll rotates with the attached transfer film while the table having the substrate thereon moves at a constant speed along with the surface of the transfer roll. As the convex portion of the transfer film including the halftone dots contacts the substrate, the aligning solution filled in the grooves of the convex portion of the transfer film is transferred to the substrate by the anilox roll. The aligning solution is gathered at the edges of the convex portion by the anilox roll as the printing roll rotates. Thus, the aligning solution is thicker at the grooves about leading and wayward edges of the convex portion. This phenomenon can be referred to as the marginal phenomenon.

SUMMARY OF THE INVENTION

Accordingly, the present invention is directed to a method of forming an alignment layer for a liquid crystal display device that substantially obviates one or more of the problems due to limitations and disadvantages of the related art.

An object of the present invention is to provide a method of forming an alignment layer that has a uniform thickness for a liquid crystal display device.

Another object is to provide a transfer film for forming an alignment layer of a liquid crystal display device that has a uniform thickness.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of forming an alignment layer for a liquid crystal display device includes: attaching a transfer film on a printing roll, the transfer film including a convex portion having first-sized halftone dots and second-sized halftone dots; positioning a substrate on a printing table; providing aligning solution on an anilox roll using a doctor roll; and transferring the aligning solution on the anilox roll to the transfer film while moving the printing table and rotating the printing roll, and then coating the aligning solution on the substrate to thereby form an alignment layer on the substrate.

In another aspect of the present invention, a method of forming an alignment layer for a liquid crystal display device using a printing apparatus having a printing table, a printing roll, an anilox roll and a doctor roll, includes: attaching a transfer film on the printing roll, the transfer film including a convex portion, wherein the convex portion has first-sized halftone dots and second-sized halftone dots; positioning a substrate on the printing table; providing aligning solution on the anilox roll using the doctor roll; and coating the aligning solution on the substrate from the anilox roll via the transfer film on the printing roll.

In yet another aspect, a transfer film to be dispersed on a printing roll for transferring an alignment solution to a substrate for forming an alignment film of an LCD device, the transfer film including a convex portion having halftone dots and a ground portion surrounding the convex portion, wherein a first part of the convex portion having first-sized halftone dots and a second part of the convex portion having second-sized dots, the first-sized halftone dots being larger than the second-sized halftone dots.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the illustrated embodiment of the present invention, which is illustrated in the accompanying drawings.

Figure 1:
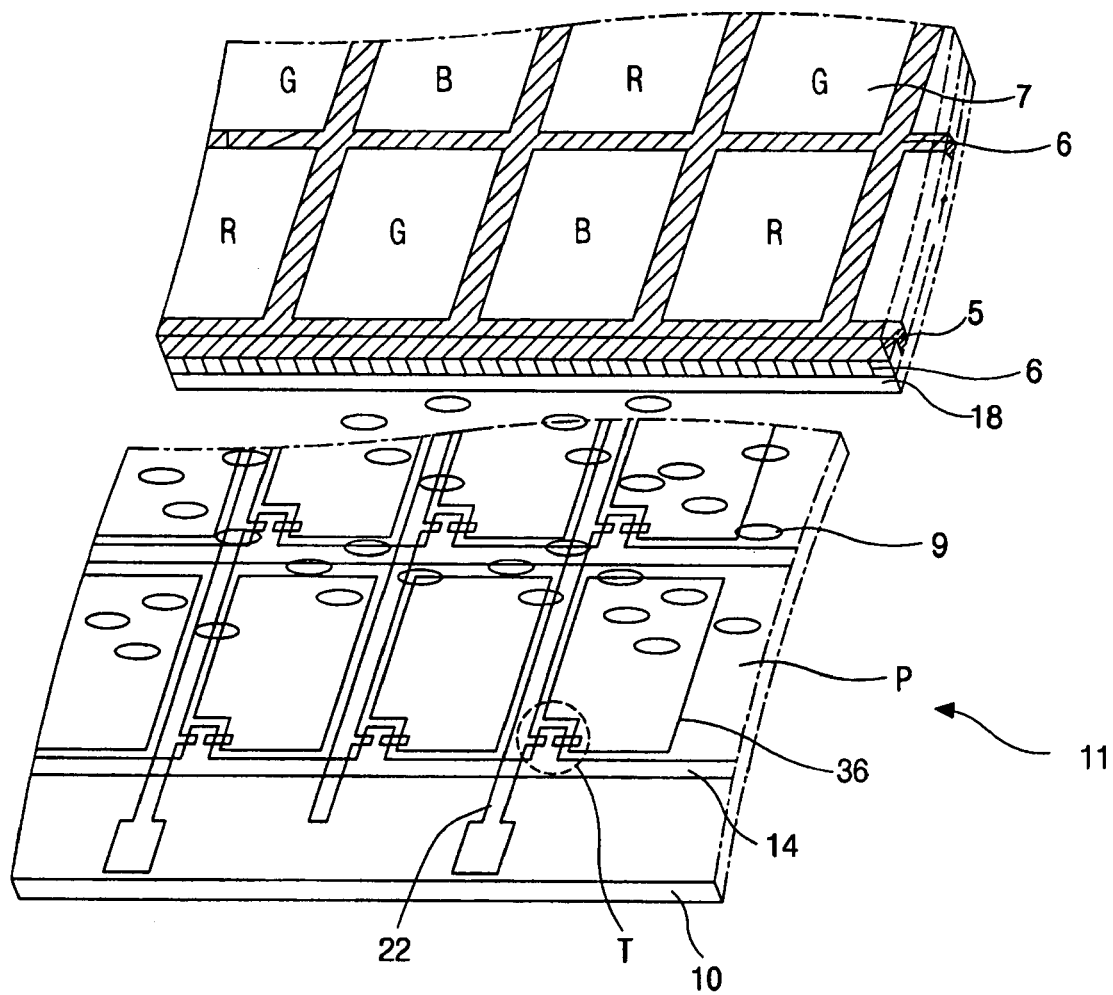
FIG. 1 is an exploded perspective view of a liquid crystal display (LCD) device according to the related art.
Figure 2:
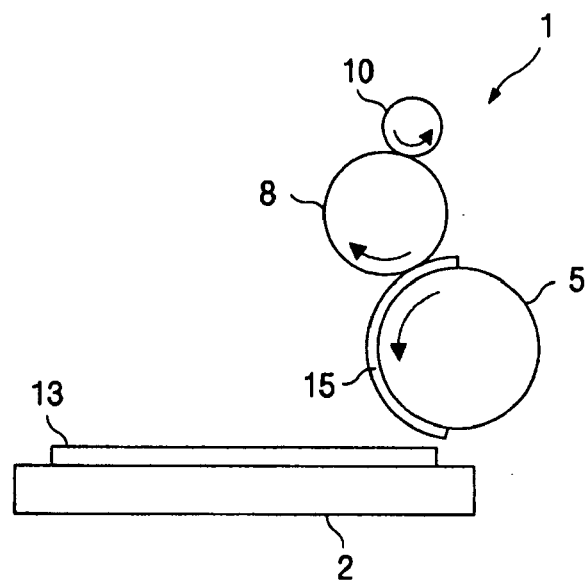
FIG. 2 is a schematic view showing a process of printing an alignment layer using a roll coating method according to the related art.
Figure 3A:
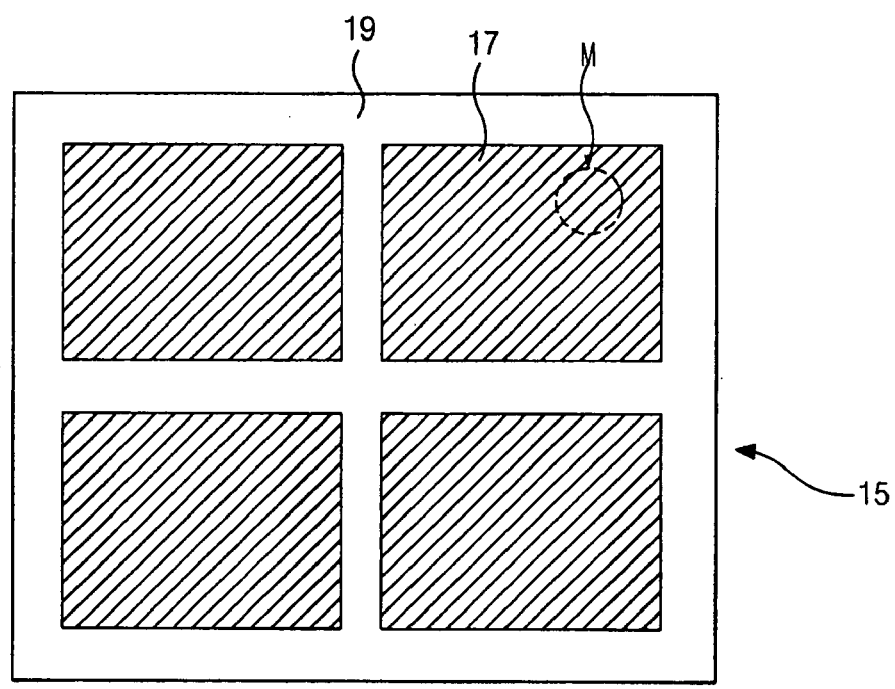
FIG. 3A is a plan view of a related art transfer film and FIG. 3B is an enlarged view of the region M of FIG. 3A.
Figure 3B:
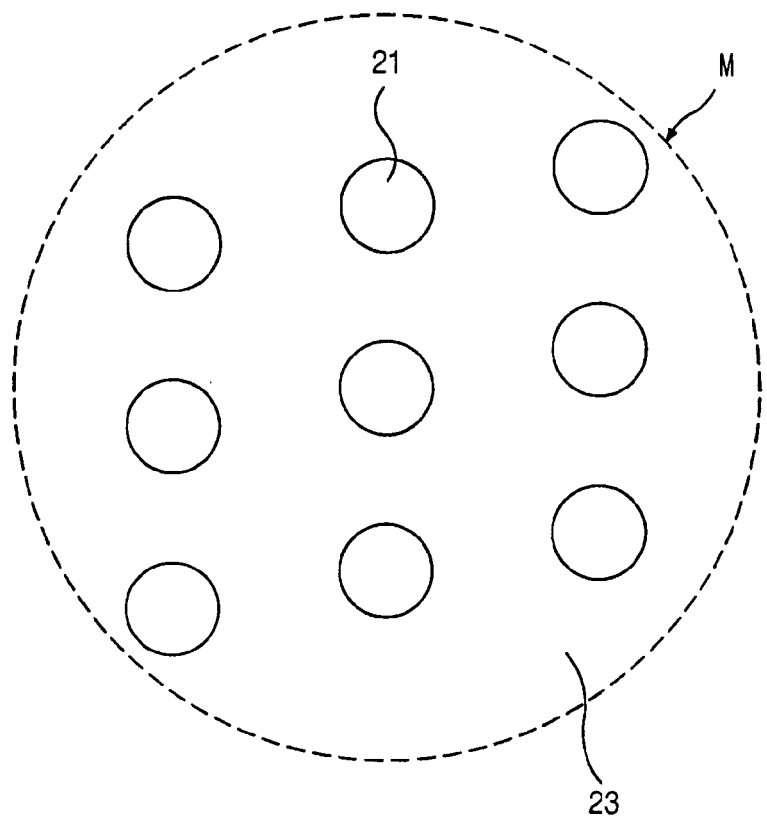
Figure 4A:
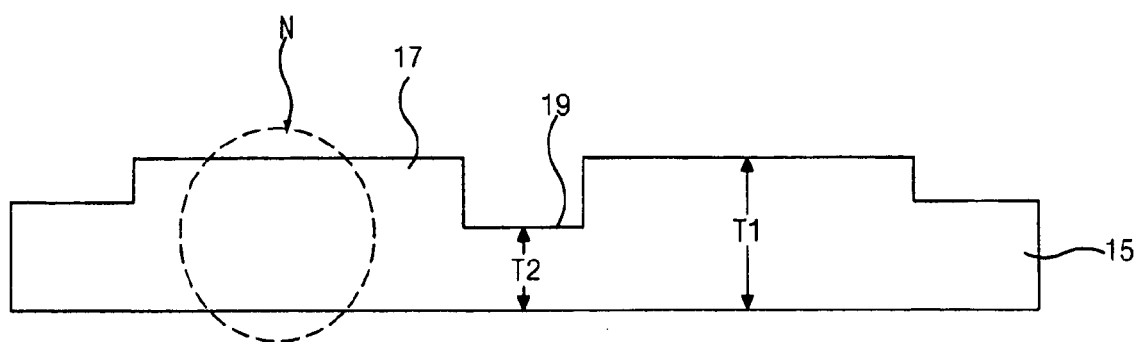
FIG. 4A is a cross-sectional view of the related art transfer film and FIG. 4B is an enlarged view of the region N of FIG. 4A.
Figure 4B:
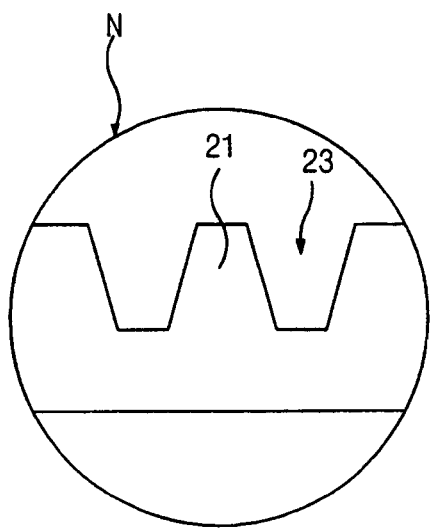
Figure 5A:
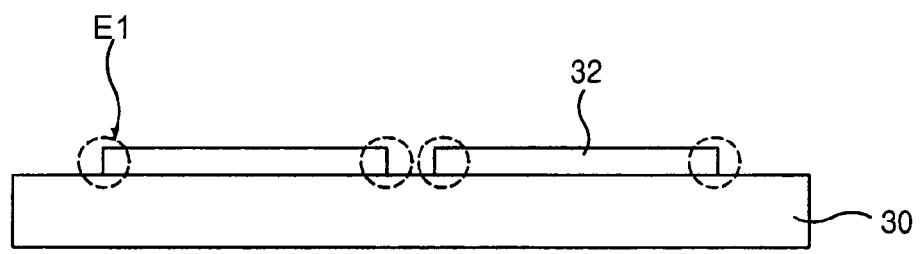
FIG. 5A is a cross-sectional view of showing an alignment layer formed on a substrate according to the related art and FIG. 5B is an enlarged view of the region E1 of FIG. 5A.
Figure 5B:
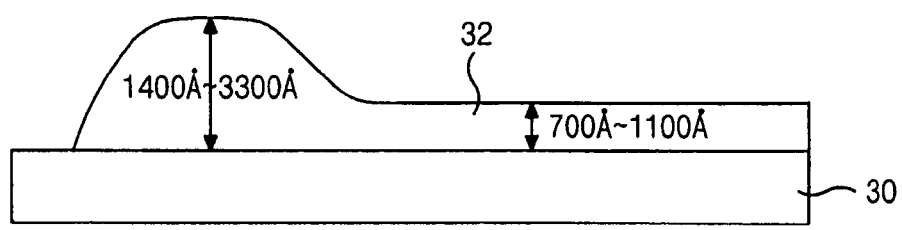
Figure 6A:
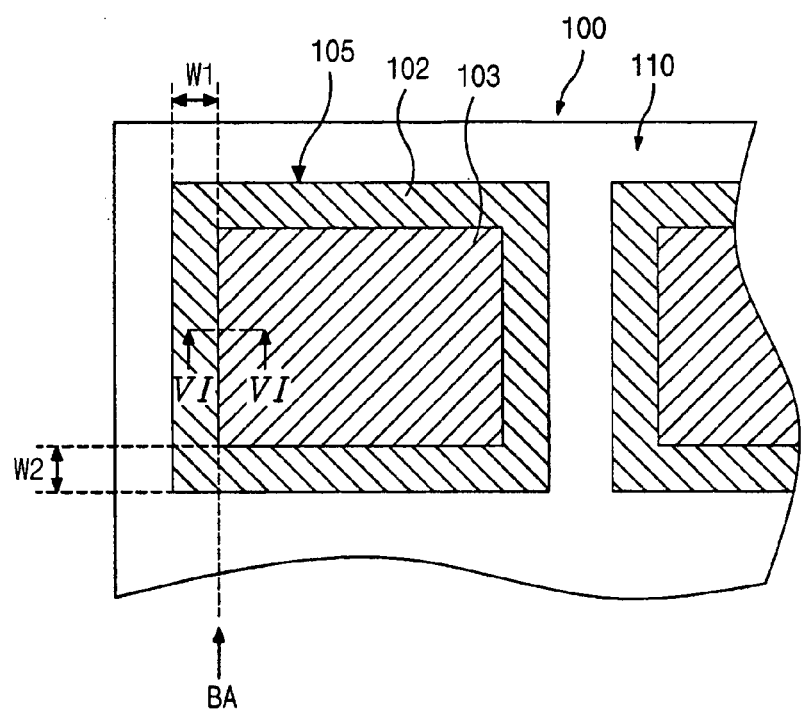
FIG. 6A is a plan view of a transfer film according to an exemplary embodiment of the present invention.
Figure 6B:
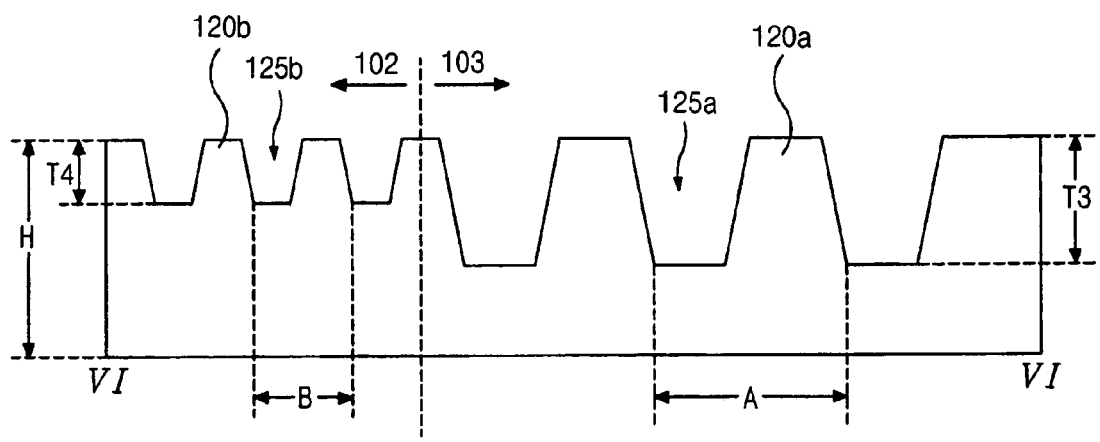
FIG. 6B is a cross-sectional view along the line VI—VI of FIG. 6A.

FIG. 6A is a plan view of a transfer film according to an exemplary embodiment of the present invention, and FIG. 6B is a cross-sectional view along the line VI—VI of FIG. 6A. As shown in FIG. 6A, the transfer film 100 includes convex portions 105 and a ground portion 110. Each convex portion 105 of the transfer film 100 contains aligning solution and transfers the aligning solution to a substrate when the transfer film contacts the substrate. The ground portion 110 surrounds the convex portions 105 and has a thinner thickness than the convex portions 105. In embodiments of the present invention, each convex portion 105 is composed of a central part 103 and an edge part 102. The central part 103 has different shapes than the edge part 102. That is, sizes and/or heights of halftone dots or meshes are different in the central part 103 than in the edge part 102 of the convex portion 105.

"Meshes" is the number of halftone dots formed in a square having a width and a length of 1 inch, i.e., 2.54 cm. For example, a transfer film of 400 meshes includes 400 halftone dots in a square of 2.54 cm long and 2.54 cm wide, which may be defined in the convex portion 105.

As stated above, in embodiments of the present invention, the central part 103 and the edge part 102 have different meshes. For example, the central part 103 can have 400 meshes, while the edge part 102 has more than 400 meshes. That is, the edge part 102 may have 400 meshes to 600 meshes. If the number of meshes varies, the spaces between the halftone dots and the sizes of the halftone dots also change. In addition, a height of the halftone dot in the central part 103 can be higher than a height of the halftone dot in the edge part 102. The edge part 102 may have widths W1 and W2 within a range of about 0 mm to 100 mm.

As shown in the embodiment of FIG. 6B, halftone dots 120a and 120b having different sizes are formed in the central part 103 and in the edge part 102, respectively, centering on a border portion BA between the central part 103 and the edge part 102. The letter A indicates a first space between halftone dots 120a of the central part 103. The letter B designates a second space between halftone dots 120b of the edge part 102. The alphanumeric T3 designates a height of the halftone dots 120a in the central part 103. The alphanumeric T4 designates a height of the halftone dots 120b in the edge part 102.

As shown in FIG. 6B, the convex portion 105 of the transfer film 100 is formed so as to satisfy the following conditions: A>B, T3>T4. Since sizes of grooves 125a and 125b are proportional to the sizes of the halftone dots 120a and 120b, the groove 125a of the central part 103 is larger and deeper than the groove 125b of the edge part 102.

Therefore, the central part 103 can contain more aligning solution than the edge part 102.

The convex portion 105 of the transfer film 100 may have an average thickness H within a range of about 2.24 mm to about 2.84 mm. Although the halftone dots in the central part 103 and the edge part 102 may have different heights, top surfaces of the halftone dots in the central part 103 and the edge part 102 are on the same plane.

A fabricating method of the transfer film will be explained hereinafter. The transfer film may be formed by attaching photo-polymer, which may be referred to as APR (Asahi kasei Photosensitive Resin), with a polyethylene film, which may be referred to as a base film. An exposer is used to form the transfer film, wherein the exposer comprises an ultra-violet (UV) lamp and a substrate, which can be made of quartz or crystal. The substrate of the exposer is situated over the lamp. A negative film, which is patterned with circle patterns having as many as halftone dots to be later formed in the convex portion, is disposed on the substrate of the exposer. The circle patterns have different sizes depending on corresponding parts, i.e., either central part or edge part. The circle patterns corresponding to the central part have lager diameters than the circle patterns corresponding to the edge part.

Next, APR of a certain thickness is coated on the negative film. A transparent base film made of polyethylene is arranged over and is attached to the coated APR. The APR attached to the base film is exposed to the UV lamp under the substrate of the exposer. Portions of APR corresponding to circle patterns are exposed to UV and hardened. Thus, the circle patterns of the negative film are transferred to the APR through UV exposure. The APR attached to the base and having the halftone dots is cleaned so that the hardened portions may remain and the non-exposed portions of APR may be removed. The hardened APR and attached base film becomes a transfer film.

The APR transfer film is dried through a dry process and the surface of the APR transfer film is further hardened via an exposure from the backside. The resulting APR transfer film has convex portions comprising a central part and an edge part, where sizes, heights and the number of halftone dots are different.

The sizes and heights of the halftone dots are controlled by exposing time and the sizes of the circle patterns on the negative film during the UV exposure. If the circle pattern on the negative film is small, the size of the halftone dot is also small and the height of the halftone dot or a depth of a groove is small.

Next, an alignment layer is coated on a substrate through a printing process using the above-mentioned transfer film. The process will be described hereinafter. The transfer film, which includes an edge part having smaller-sized halftone dots, is attached to a printing roll of a printing apparatus and a substrate is located on a printing table. Aligning solution is provided using a doctor roll such that aligning solution is uniformly transferred and coated on the surface of the anilox roll by the doctor roll, which is made of rubber and shakes while it rotates. The aligning solution coated on the surface of the anilox roll is coated on the substrate by the printing roll when the table is moved such that the transfer film having the edge part with smaller-sized halftone dots is engaged. The substrate including the aligning solution thereon is dried and cured to form an alignment layer. The alignment layer formed through the above-mentioned processes has uniform thicknesses in the edge regions and in the central region.

Figure 7A:
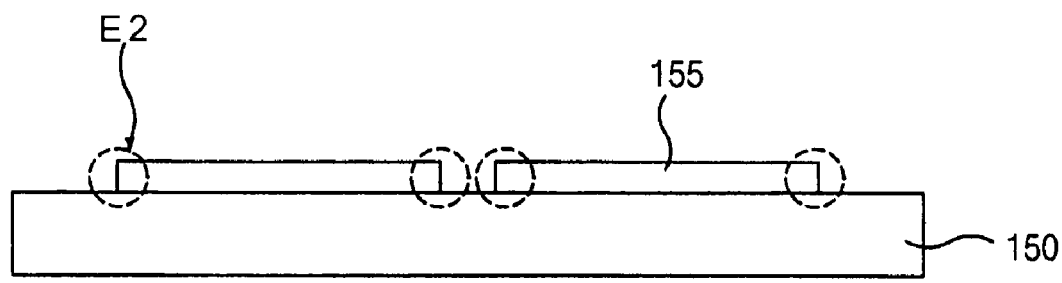
FIG. 7A is a cross-sectional view of an alignment layer formed by using a transfer film according to the present invention and FIG. 7B is a schematic enlarged view of the region E2 of FIG. 7A.
Figure 7B:
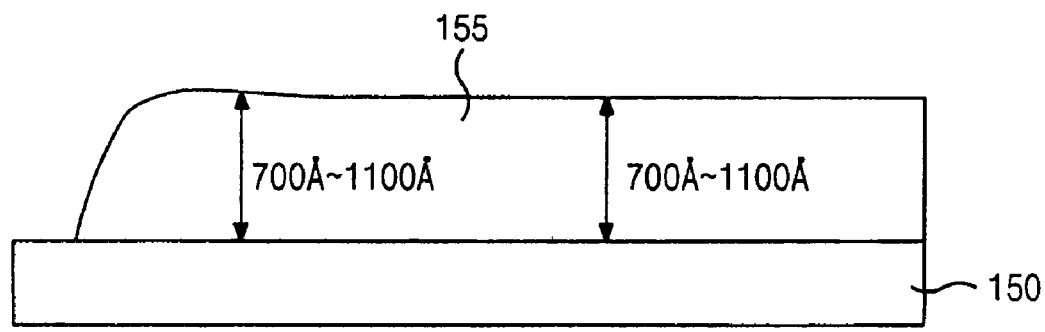

FIGS. 7A and 7B show a cross-section of an alignment layer formed by using a transfer film according to embodiments of the present invention. FIG. 7B is a schematic enlarged view of the edge region E2 of FIG. 7A. As shown in FIGS. 7A and 7B, an alignment layer 155 is formed on a substrate 150 by using a transfer film having edge part with smaller-sized halftone dots and a central part with regular-sized halftone dots. That is, the convex portion includes halftone dots of different sizes in the central part than in the edge part. The alignment layer 155 is formed using a transfer film with a convex portion film having an edge part with smaller-sized halftone dots and an central part with regular-sized dots to have a uniform thickness within a range of about 700 Å to about 1,100 Å. Accordingly, the alignment layer 155 has uniform thickness in the central region and in the edge region.

In embodiments of the present invention, the alignment layer is formed by a roll coating method using a transfer film with a convex portion film having an edge part with smaller-sized halftone dots and a central part with regular-sized dots. Thus, the marginal phenomenon can be prevented and the alignment layer can have a preferable thickness within a range of about 700 Å to about 1,100 Å. Accordingly, the alignment layer has a uniform thickness across the substrate, and images of the device are improved.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of forming an alignment layer for a liquid crystal display device, comprising:
    attaching a transfer film on a printing roll, the transfer film including a convex portion having first-sized halftone dots, first-sized grooves proportional to the first-sized halftone dots, second-sized halftone dots and second-sized grooves proportional to the second-sized halftone dots, wherein the first-sized halftone dots are located in a central part of the convex portion and the second-sized halftone dots are located in an edge part of the convex portion and wherein the central part has 400 meshes and the edge part has 400 to 600 meshes;
    positioning a substrate on a printing table;
    providing aligning solution on an anilox roll using a doctor roll; and
    transferring the aligning solution on the anilox roll to the transfer film while moving the printing table and rotating the printing roll, and then coating the aligning solution on the substrate to thereby form an alignment layer on the substrate, wherein the alignment layer has a uniform thickness within a range of about 700 Å to about 1,100 Å and wherein the first-sized halftone dots are larger than the second-sized halftone dots and the first-sized grooves are larger and deeper than the second-sized grooves.

2. The method according to claim 1, wherein the edge part of the convex portion has a width within a range of about 0 mm to about 100 mm.

3. The method according to claim 1, wherein the transfer film further includes a ground portion surrounding the convex portion, wherein the ground portion has a thinner average thickness than the convex portion.

4. The method according to claim 1, wherein the convex portion of the transfer film has an average thickness within a range of about 2.24 mm to about 2.84 mm.

5. The method according to claim 1, further comprising a step of curing the alignment layer.

6. A method of forming an alignment layer for a liquid crystal display device using a printing apparatus having a printing table, a printing roll, an anilox roll and a doctor roll, comprising:
    attaching a transfer film on the printing roll, the transfer film including a convex portion, wherein the convex portion has first-sized halftone dots, first-sized grooves proportional to the first-sized halftone dots, second-sized halftone dots and second-sized grooves proportional to the second-sized halftone dots, wherein the first-sized halftone dots are located in a central part of the convex portion and the second-sized halftone dots are located in an edge part of the convex portion and wherein the central part has 400 meshes and the edge part has 400 to 600 meshes;
    positioning a substrate on the printing table;
    providing aligning solution on the anilox roll using the doctor roll; and
    coating the aligning solution on the substrate from the anilox roll via the transfer film on the printing roll to thereby form an alignment layer on the substrate, wherein the alignment layer has a uniform thickness within a range of about 700 Å to about 1,100 Å and wherein the convex portion includes a first part corresponding to the first-sized halftone dots and a second part corresponding to the second-sized dots, the first-sized halftone dots being larger than the second-sized halftone dots and the first-sized grooves being larger and deeper than the second-sized grooves.

7. The method according to claim 6, wherein the convex portion of the transfer film has an average thickness within a range of about 2.24 mm to about 2.84 mm.

8. The method according to claim 6, wherein the transfer film further includes a ground portion surrounding the convex portion, the ground portion having a thinner average thickness than the convex portion.

* * * * *